(12) United States Patent
Smith

(10) Patent No.: US 9,341,642 B1
(45) Date of Patent: *May 17, 2016

(54) LASER SYSTEM FOR MEASURING FLUID VELOCITY

(71) Applicant: David C. Smith, Old Saybrook, CT (US)

(72) Inventor: David C. Smith, Old Saybrook, CT (US)

(73) Assignee: Charles Nessler, Chester, CT (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/914,619

(22) Filed: Jun. 10, 2013

Related U.S. Application Data (63) Continuation-in-part of application No. 13/736,938, filed on Jan. 8, 2013, now abandoned, which is a continuation-in-part of application No. 12/882,028, filed on Sep. 14, 2010, now Pat. No. 8,347,543.

(51) Int. Cl.
  *F41G 1/32* (2006.01)
  *G01P 5/26* (2006.01)

(52) U.S. Cl.
  CPC ........................................ *G01P 5/26* (2013.01)

(58) Field of Classification Search
  CPC ................ F41G 3/08; G01P 5/26; G01P 5/10
  USPC ......... 73/23.24, 170.07, 170.11, 170.12, 861;
  42/114, 115; 89/200, 41.06; 356/614, 356/615, 622
  See application file for complete search history.

(56) References Cited

U.S. PATENT DOCUMENTS

| | | | |
|---|---|---|---|
| 5,042,922 A * | 8/1991 | Pepper | 349/17 |
| 6,066,842 A * | 5/2000 | Livingston | 250/203.2 |
| 6,363,648 B1 * | 4/2002 | Kranich et al. | 42/117 |
| 8,347,543 B1 * | 1/2013 | Smith | 42/114 |

* cited by examiner

*Primary Examiner* — J. Woodrow Eldred
(74) *Attorney, Agent, or Firm* — C. Nessler (57) ABSTRACT

Apparatus and method for measuring fluid velocity in a conduit or in open space comprises providing a laser which sends a beam through the fluid, measuring how the beam deflects due to the effect of transverse-moving fluid on the beam, and calculating velocity based on the deflection. The laser beam is one which causes thermal blooming within the fluid and that causes the beam to deflect as a function of the velocity of the fluid. The beam deflection is directly or indirectly measured, for example by looking at the movement of a beam spot on a target, or by sensing the change in intensity of the beam at a target.

20 Claims, 4 Drawing Sheets

LASER SYSTEM FOR MEASURING FLUID VELOCITY

This application is a continuation in part of application Ser. No. 13/736,938, filed Jan. 8, 2013, abandoned, which is a continuation in part of application Ser. No. 12/882,028 filed Sep. 14, 2010, now U.S. Pat. No. 8,347,543.

TECHNICAL FIELD

The present invention relates to means and method for measuring the velocity of fluids flowing in a conduit or in free space.

BACKGROUND

Knowing the wind velocity of atmospheric air may be of interest for such as meteorological purposes or the effect on heating and cooling of an object. Thus, there is a general continuing need for measuring well the motion of air in the atmosphere. And there is a generalized and continuing need for measuring the motion of fluids transverse to an observation point, for instance, or to determine volume flow of fluids, both within and without conduits in commercial and industrial processes. As a corollary, it is desirable to measure the velocity of a vehicle or other thing relative to the air or gas or other fluid mass through which it moves. For, instance, it may be desired to know the velocity of a motor vehicle or water craft relative to the ambient air mass.

There are many devices known for measuring the velocity of fluids. However, it may be particularly difficult to accurately measure very low velocities, particularly velocities of low mass fluids such as common gases. One problem that may be encountered is that there can be unwanted interaction between the fluid and the means used for measuring velocity. For example, a sensor placed in a gas stream can be subject to erosion, corrosion, accretion, etc. A positive displacement flow meter may be subject to wear. In another aspect, a sensor may disrupt the fluid flow. For example, an orifice plate, propeller or turbine can create undesirable pressure drop and turbulence. In other examples, a variable area or rotometer type flow meter may create pressure drop and have limited range; a heated probe may react with the fluid; a pitot tube may become clogged by debris or condensation, and so forth. Thus it is desirable to have a means which does not require interposition into a fluid stream, in particular a gas stream of a sensor which interacts with the fluid.

Another problem presents when the cross sectional area of the flowing fluid is large, as in a large conduit or free space. The fluid velocity can vary markedly from point to point within the moving fluid mass at the location where it is being measured. To cope with that phenomenon in the prior art an algorithmic calculation may be made based on data taken at one location. For example, the algorithm may assume a certain velocity distribution in the plane of the cross section of a conduit. Thus, accuracy depends on the quality of the algorithm and constancy of fluid behavior. Alternately, a multiplicity of measurements may be made at different locations, as by either using a multiplicity of sensors, or by using a traversing mechanism to move one sensor from point to point. It would be desirable to avoid either alternative and to have a better way of ascertaining the integrated effect of velocity which varies from point to point within the moving fluid mass.

The present invention employs particular lasers. In the prior art, laser Doppler flow meters are useful because they do not require a probe in the gas stream. But commercial Doppler type devices depend for their operation on the presence of particulate matter in the gas. And, particularly when the particles are large, the particle velocity will be less than the velocity of the gas itself, producing probable unknown error.

SUMMARY

An object of the invention is to provide a device and method for measuring the flow of fluids in closed and open spaces which utilizes a means which avoids having a sensor in the fluid path. A further object is measure fluid flow accurately when velocity is low. A still further object is to measure integrated velocity across the fluid flow path and on different axes of the cross section of fluid flow path.

In embodiments of the invention, to measure fluid velocity a laser beam produced by a laser beam source is passed through the fluid within a space. The laser beam has properties such as wavelength and intensity which effect thermal blooming of the beam during its passage through the fluid, which phenomenon results in deviation of deflection of the beam from the straight line path along which the beam was projected, when the fluid is moving. The deviation of the beam is a function of the fluid velocity and is in a direction opposite to the direction of the velocity of fluid.

In embodiments of the invention, the deviation of the laser beam or its effects on a target or sensor are measured and velocity can be determined therefrom. The deviation of a beam from a straight line path may be directly observed when the beam path is visible; or the beam may be intercepted by—that is impacted on—a target which is located at or beyond a boundary of the space within which the fluid flows and within which the beam travels. The target may be observed optically, or may comprise electronic or optical sensors which indicate beam position. Alternatively, a knife edge plate or aperture plate may be placed in front of the target so that part of the beam hits the plate and part of the beam passes by the plate and hits the target. The intensity of the beam which hits the target may be measured to thereby indirectly indicate how the beam has deflected, since the intensity will vary when beam moves onto or off of the plate, thereby varying the amount of beam energy which is received by the target. A lens may be interposed along the beam path in front of the target, to magnify the beam deflection and shorten the length of the device. Mirrors may be along the beam path, between the source and the target.

In further embodiments of the invention, a gage or meter for measuring the flow of fluid, particularly suited for scientific, industrial or commercial use, comprises a laser mounted outside, on, or inside the wall of a conduit. The target may be either inside, on, or outside of the opposing side wall. If the conduit is not transparent, ports in the conduit wall allow beam passage. There may be one or more mirrors placed along the beam path, to cause the beam to travel transversely on different segments of beam path within the conduit, before hitting the target. The target may be located in vicinity of the source. In another embodiment of the invention, the laser and target are mounted on an object which is moving through fluid, to measure the object velocity relative to the fluid.

The foregoing present invention and other objects, features and advantages of the present invention will become more apparent from the following description of preferred embodiments and accompanying drawings.

DESCRIPTION

This application is a continuation in part of application Ser. No. 13/736,938, filed Jan. 8, 2013, now abandoned, which is a continuation in part of application Ser. No. 12/882,028 filed Sep. 14, 2010, now U.S. Pat. No. 8,347,543. The entire disclosures of said applications are hereby incorporated by reference.

Preferred embodiments of the invention are often described with respect to exemplary flow of air. The invention can be used for other gases and for measuring liquid flow, when the fluid is transmissive of laser beams. For instance, the flow velocity may be measured for such liquids as gasoline, other hydrocarbons; alcohols, vegetable oils, mammal milks, etc. In the examples when a reference is made for simplicity to "wind" in connection with air/gas, it will be understood that if the fluid is instead a liquid, the term refers to the liquid velocity.

The grand parent application Ser. No. 12/882,028 describes how the motion path of an object, such as a bullet or airplane, traveling through a gas such as air which has a velocity component transverse to the motion path of the object, can be controlled with respect to such velocity component by use of a particular laser and technique for measuring the velocity of gases. That invention and the present invention make use of a phenomenon generally called thermal blooming. When beams of sufficiently high energy and particular wavelength are transmitted through a particular suitable fluid medium, for instance in a gas such as air, the medium is heated by absorption of a fraction of the beam radiation.

In embodiments of the invention of the grand parent application and of the present invention, a laser beam of selected wavelength and intensity heats a moving medium, resulting in the beam being distorted and deflected from a straight line path. When, for example, atmospheric air is moving transverse to the beam path, the thermal blooming effect is asymmetrical in that the air temperature is higher on the downstream side of the beam (also called, the downwind, or leeward side of the beam). As a result the index of refraction of the air is lower on the leeward side of the beam, compared to the index at the windward side of the beam. That difference in refracting index causes the beam to deflect, or bend, in the upwind, or windward direction.

The extent of thermal blooming is directly proportional to the intensity of the beam and inversely proportional to the transverse velocity of the wind. The total deviation or deflection of a given beam is therefore reflective of the integration of the differential deviations of the beam that take place along differential increments of the length of the beam path in the moving gas. The total deviation of the beam is a measure of the integrated effect of transverse gas velocity along the increments of the beam path. When an object such as a bullet from a gun is being propelled toward the target or something in its vicinity, the aim of the object can be adjusted to compensate for the effect of the moving gas, as described in application Ser. No. 12/882,028. The foregoing phenomena have been discovered to be useful for measuring fluid velocity in other situations and to achieve objects of the invention.

Figure 1:
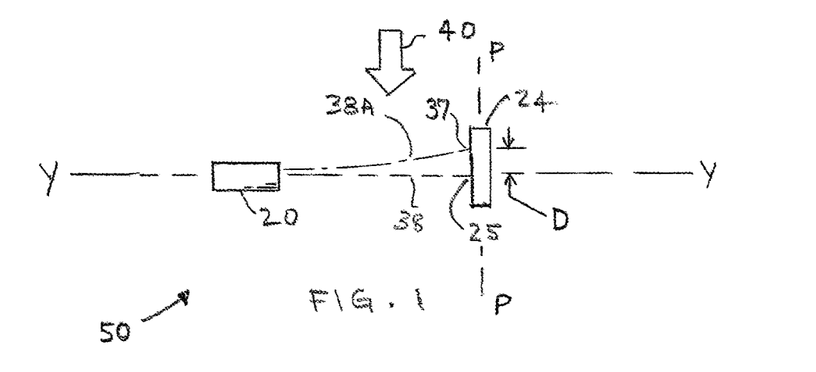
FIG. 1 is a semi-schematic top view of a gage embodiment where displacement of a laser beam impact point on a target is used to measure gas velocity.

FIG. 1 shows, in semi-schematic fashion and plan-view, a gage embodiment 50, comprising a laser beam source 20 (more simply called a "laser" or "laser source" below) which produces a beam 38 that is projected toward target 24. Gas motion (wind) 40 is partly or wholly transverse to the beam path, in the space between the source and target. When the velocity of the wind is zero, the beam impacts on target 24 at point 25, which lies in the plane PP along the straight line axis YY of the laser. Point 25 is a reference point since it lies along a straight line path which is aligned with the beam axis of the laser source device, and that is the path of the beam when the beam is not affected by interaction with the fluid medium in the space between the source and target.

As will be understood further from the description here, the term "target" may comprehend a passive device, such as a plate having an at least partially reflective surface upon which the impact point of a laser beam is detectable by optical means, or an active device, such as an electronic device like a charge coupled device which emits signals according to where a beam impacts the device, or a device which produces a signal corresponding with the intensity of beam where it impacts the device.

When there is a wind 40, the beam deflects upwind due to the thermal blooming phenomenon, travels along path 38A, and impacts at point 37. The amount of deflection in this and other Figures is exaggerated for clarity of illustration. The terms deflection and deviation are used interchangeably herein. The distance D between the first and second impact points 25, 37 can be measured optically by looking at the target surface, or by such as light sensors which comprise, or are built into, the target. (Sensors for sensing laser light beam presence, absence, location, and intensity, which are useful in this and other embodiments, are commercially known and within the ordinary skill. For example, to find position change, a charge coupled device or an optical viewing system may be used. For example, to measure beam intensity at a target a photometer or a temperature sensing device may be used.) Consulting a look-up table of previously acquired calibration data enables calculation of the integrated velocity of the wind along the beam bath, which calculation may be made by using a suitable computer, microprocessor, or like electromagnetic device. The calibration data may be gathered by using one of alternative known accurate methods of measuring fluid velocity.

Figure 2A:
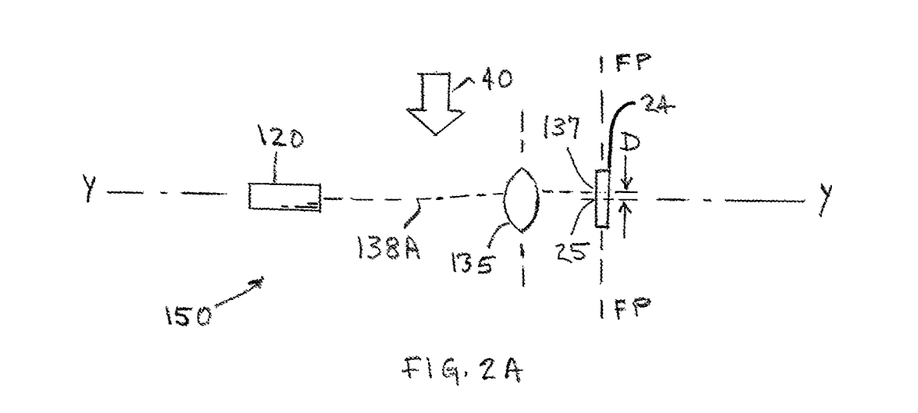
FIG. 2A is a semi-schematic top view of a gage embodiment having a lens which directs the beam to a target which may be a beam impact position sensor.

FIG. 2A semi-schematically shows a system like that of FIG. 1, but employing a lens 135 that enables a compact gage size. This is discussed further below.

Figure 2B:
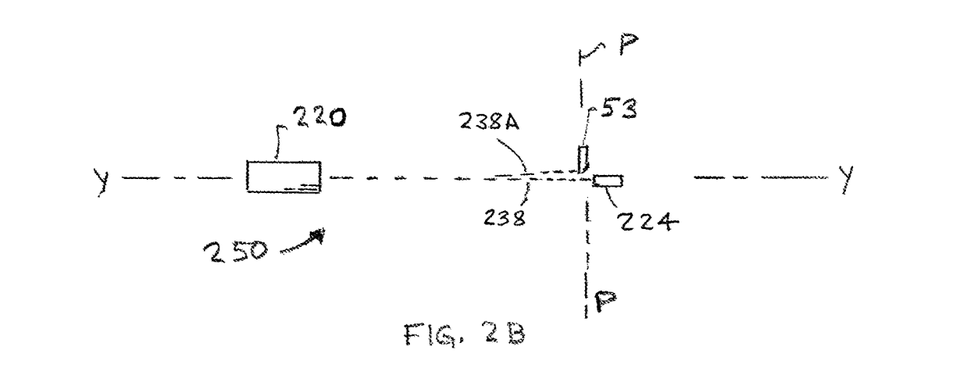
FIG. 2B is a semi-schematic top view of a gage embodiment having a plate with a knife edge plate interposed between the laser and light intensity sensor.

FIG. 2B shows a system employing a knife edge plate located along the beam path between the laser beam source and the target. The configuration is such that the beam, when deflected the maximum amount (when the fluid is moving very slowly), travels along a bent path 238A and mostly impinges on the knife edge and only a small amount on the target 224 which may be an intensity sensor 224. Then, when the fluid velocity increases, the beam increasingly moves toward the straight line path 238, and a larger portion of the beam hits the sensor and a lesser portion hits the knife plate. Thus the intensity of light sensed, and the signal produced, by sensor 224 is inversely related to velocity. The way in which this device works is discussed in more detail below.

The invention may be used for gaging velocity of fluid flowing within a conduit or other channeling device; such fluids are considered herein to be flowing in closed space. (Generally, in the present invention a conduit is any device which confines or channels the flow of a fluid and is not limited to the tube or pipe type devices of the examples and Figures here, discussed below.) The invention may also be used for gaging velocity of fluid flowing in such as the atmosphere of the earth, or for gaging the motion through fluid of an object to which the gage is attached. When the fluid, for which the velocity is being measured, is unconfined as by a conduit, such fluids are considered herein to be in free space.

Figure 3:
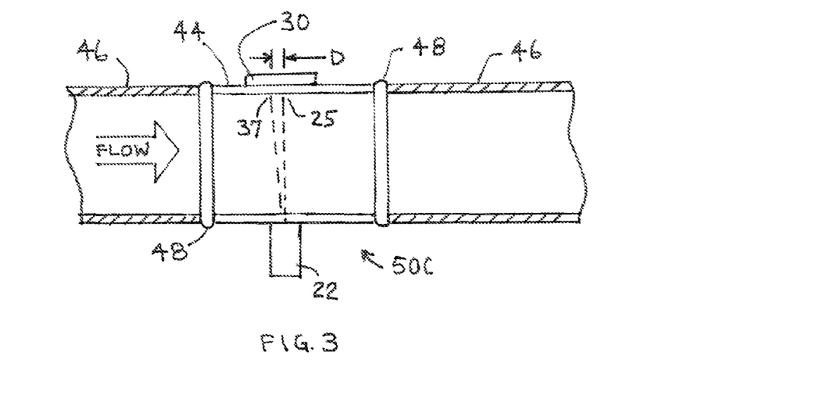
FIG. 3 is a lengthwise cross section view of conduit containing a flow gage comprising a laser and an opposing-side target.

FIG. 3 semi-schematically shows in lengthwise cross section gage 50C that is coupled to a fluid carrying duct of conduit 46 by means of connectors 48. A fluid, which may be a gas or liquid, is traveling through the conduit as indicated by the arrow labeled Flow. Gage 50C comprises opposing windows 42, 44 which are laser beam-transparent. Target 30 is impinged upon by a beam 32 from laser 22. Depending on the fluid velocity, the beam path will change. Typical paths 32, represented here and elsewhere by dashed lines, are shown in the Figure and they lead to impact points 25 and 37. Point 25 is that which is along the line of sight, a straight line path, of the laser device. It is the impact point of a beam if there was a vacuum in the conduit. The distance D between a fluid-velocity-affected-impact point 37 and the reference impact point 25 is measured and the velocity of the fluid may be calculated according to previously acquired calibration data; likewise the volume rate of flow may be calculated, knowing the conduit cross section and an appropriate algorithm.

Figure 4:
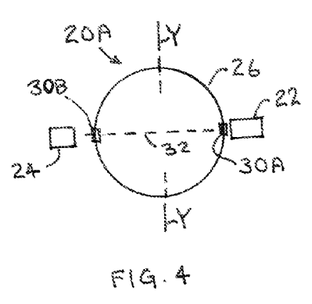
FIG. 4 is a schematic transverse cross section view of a round conduit and associated laser gage, where the beam makes one path across the conduit.
Figure 5:
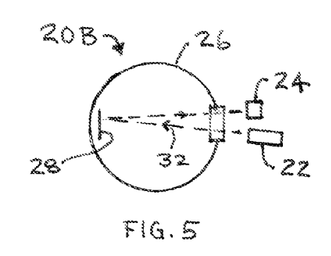
FIG. 5 is a schematic transverse cross section view of a round conduit having a laser gage, the beam of which is reflected off a mirror on the side of the conduit opposite from the gage.
Figure 5A:
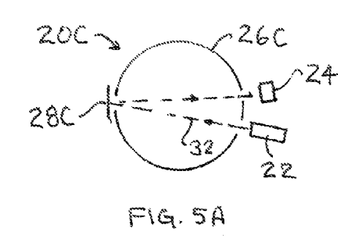
FIG. 5A is a like FIG. 5, but shows the mirror located outside the conduit, with the beam passing through a port in the wall of the conduit.
Figure 6:
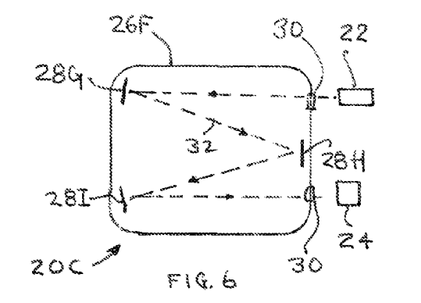
FIG. 6 is a schematic transverse cross section view of a square cross section conduit with a gage comprised of internal mirrors so that a laser beam travels back and forth across the conduit at different cross sectional elevations.

FIGS. 4-6 show transverse cross sections of conduits and associated gage embodiments which are useful for measuring fluid velocity within the conduit. The same concepts can be used for gaging the velocity of fluid flowing in free space by mounting the laser source, the target and any associated mirrors on one or more bases positioned in the free space.

FIG. 4 shows an embodiment where the beam 32 from laser source 22, which is mounted adjacent a first side of the circular wall which defines a conduit 26, passes through window 30A, then through the fluid flowing toward or away from the viewer of the Figure, and then through a second window 30B on the opposing side of the conduit, to impact on target 24. In a variation, applicable here, and for other conduit-related embodiments, the laser source 22 and target may alternatively be positioned so they are integral with, or interior of, the wall of the conduit.

In the embodiment of gage 20B shown in FIG. 5, beam 32 is transmitted through window 30 on the side of a conduit 26; and then the beam is reflected back toward the origination side of the conduit by mirror 28, to pass again through the window 30 and impact on the target 24 which is located near the laser. If the flow is uniform across the cross section, that would double the beam path and double the deflection. Other known devices for changing beam path, or for reflecting the beam, may be used in substitution of a mirror in this and other embodiments. For instance, a prism may be used. In the claims, the term "mirror" comprehends any thing which re-directs a beam and may include a wall of a conduit.

FIG. 5A is shows a conduit 26C which has a laser 22 attached to its wall. The beam shines through an opposing-side port to impact mirror 28C; the beam 32 is reflected back through the window and across the conduit, to pass through another port and impinge on target/detector 24.

FIG. 6 shows a gage 20C wherein beam 32 from laser 22 is successively reflected back and forth across the interior of square cross section conduit 26F by mirrors 28G, 28H and 28I, to impact on target 24. In this and other embodiments, single mirrors may be replaced by larger mirrors which are impacted at different locations. Causing the beam to travel back and forth along different segments of a path provides integrated information about the fluid flow along each segment, and thus appropriate computation can produce more precise data about velocity and volume flow within the conduit than does a single transit. In the foregoing embodiments, when the beam source and the target are located on the same side of the conduit, they are considered to be in vicinity of each other.

Apparatus of the invention may comprise multiple lasers. For example, in the device of FIG. 4, a second laser and target may be added so a second beam travels along the vertical axis Y-Y. The integrated velocity readings of the two different lasers can be computationally combined to provide a single reading representative of flow volume.

Where a window or port is described, such window may be a transparent material such as glass; alternately, the window or port is simply a hole in the conduit. Alternately, the conduit may be made of laser-transmissive material. The laser beam is preferably projected along the cross section of the conduit, that is, perpendicular to the length of the conduit. In the generality of the invention, the beam may be projected with only along a path which is inclined to the lengthwise axis of the conduit or the flow direction of the fluid.

Figure 8:
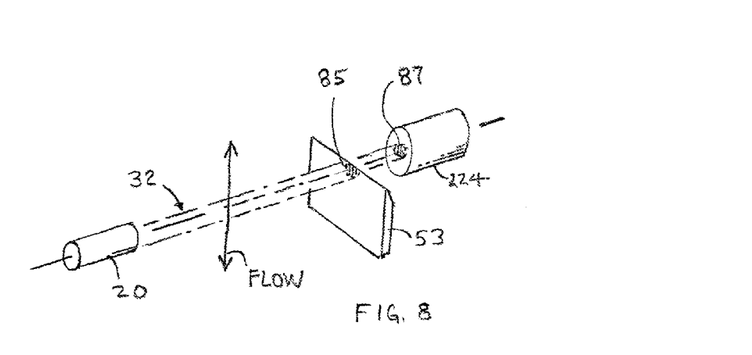
FIG. 8 is a perspective view of a gage comprising a laser and intensity detector, with an interposed knife edge plate, showing the impingement pattern of the laser beam spot on the plate and detector.

Referring again to FIG. 2A, gage embodiment 150 is much like gage 50 of FIG. 1. Embodiment 150 makes easier more accurate measurement of deflection D when the amount of deflection D is rather small. Under such circumstances, it would be desirable to have the target located a large distance from the laser and the moving fluid, because as the beam continues on its angled path its deviation from the axis YY is magnified. However, that is counter to a usual aim of having a compact measuring instrument. In gage 150 the beam 138A of laser 122 travels along axis YY through the space containing the flowing fluid (wind 40) and passes through lens 135 and then impacts target/sensor 24. The beam is deflected from a straight line when passing through the space bounded by the laser source and the lens due to the effect to wind 40. Convex lens 135 bends the beam so it impinges on the surface of target 124 which is located at focal plane FP-FP. Thus, the features of this embodiment enable the target to be located closer to the lens than the embodiment of FIG. 1, thereby enabling a compact gage in which the amount of deflection D is magnified and more readily measurable. The movement of the impact point of the beam can be sensed, as described in connection with embodiment 50, or the intensity of the beam can be sensed as described in connection with FIG. 2B and FIG. 8. In FIG. 2A, target 24 is shown in a position that is along axis YY. In other embodiments, the target may be located off-axis YY. In another embodiment, lens 138A may be replaced by a convex mirror and the target will be re-positioned to receive the reflected beam. A lens as used herein comprehends any device for altering the path of the beam and may include such as a mirror. In another aspect, the phase of the light which impacts the lens is changed and measured.

Figure 7:
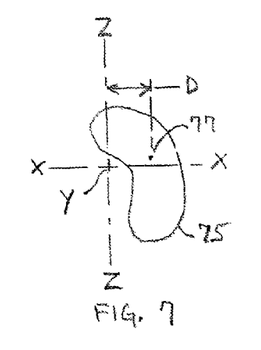
FIG. 7 shows a representative impact pattern of a wind-influenced laser beam on the surface of a target.

The pattern of the beam on the target varies according to various factors as described more fully in the description of grand parent application Ser. No. 12/882,028, now U.S. Pat. No. 8,347,543, particularly that description which is associated with FIGS. 7, 8 and 9. FIG. 7 herein is an illustration of the outline of a representative wind-affected beam impact pattern 75, looking at the surface of a target located in the X-Z plane, which is perpendicular to the YY axis of the laser and beam. In this example, the beam pattern is irregular and it is off-center with respect to the ZZ axis. The beam has a centroid 77 which can be determined by a combination of light sensing and calculation; and, the offset D of the centroid, or more simply stated, the offset of the beam impact/impingement point is determinable. For simplicity in connection with further discussion here, the beam is shown as having circular pattern, at the center of which would be the centroid of an actual beam.

In another embodiment of the invention, the intensity of light received at the target/sensor is used to indicate fluid velocity, compared to sensing the change in location of the beam impact. In an exemplary embodiment, shown in FIG. 8, a knife edge plate 53 is positioned upstream of the target. The laser beam 32 is aimed so that when there is zero or near-zero velocity of fluid flow in the space between the laser and the knife edge, nominally half the beam 32 from the laser 20 hits the knife edge plate, with a nominal half-circle pattern 85, and half the beam impacts the target which is light-intensity sensor 24, with a second nominal half-circle pattern 87. When the beam is deflected by flowing fluid having a velocity component in a direction perpendicular to the knife edge, the beam shifts up and down in the Figure, according to the direction and velocity of the wind. Such a device is discussed in connection with FIG. 8. Other embodiments which rely on sensing beam intensity at a target may be used, in accord with the teaching of the foregoing examples. Measuring the intensity of the beam received at the target may be considered an indirect way of indicating beam deflection.

Figure 8A:
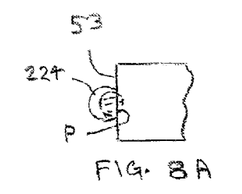
FIGS. 8A, 8B and 8C are views along the laser beam path, showing the front face of a knife edge plate and how a laser beam spot pattern moves about under different fluid velocity conditions.
Figure 8B:
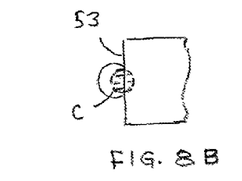
Figure 8C:
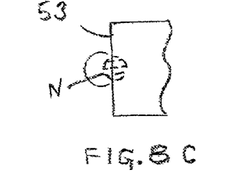

FIGS. 8A, 8B and 8C are views looking along the beam path toward the target, namely light intensity sensor 224. (In these Figures, plate 53 is rotated 90 degrees from the position shown in FIG. 8.) The FIGS. 8A, 8B and 8C graphically illustrate the change in location of the beam spot and the resultant changing size of beam spot portion which impacts the sensor. The light received at the target for the three fluid velocity conditions P, C and N, having associated different beam impact point locations, P, C and N, are schematically illustrated. FIG. 8C shows the condition described in connection with FIG. 8, with near-zero velocity, where the beam spot C is nominally cut in half. In FIG. 8A, the beam has shifted as a result of different wind velocity, so that more than half of the spot P is impinged on the sensor. In FIG. 8B the beam has shifted in a direction opposite to the shift shown in FIG. 8A so that less than half the beam spot N hits the sensor. Exemplarily, that indicates the flow direction of condition N is opposite that for condition P.

Figure 9:
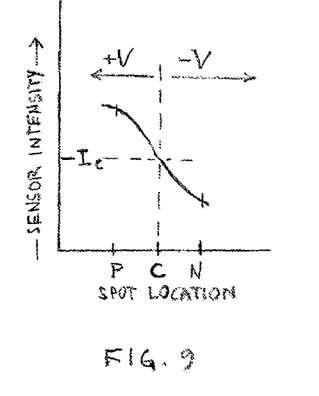
FIG. 9 is a graph depicting how light intensity which is sensed at a detector of the device of FIG. 8 varies, according to the different beam spots or impact points illustrated by FIGS. 8A, 8B and 8C.

FIG. 9 is a plot of beam intensity as a function of beam location, and shows that the user will now whether flow velocity is positive (+V) or negative (−V), according to whether the intensity is more of less than intensity level $I_c$. It will be apparent that a measurement of intensity will indicate the direction and extent to which the beam has moved from its reference position C in FIG. 8B.

As will be appreciated from the nature of the thermal blooming phenomenon, when there is zero wind, the beam will not deflect but can become somewhat diffuse. Thus, it may be more convenient to use the low velocity, or near-zero velocity, location of the beam as a reference point in the embodiments which use a knife edge plate, aperture plate, or equivalents. Alternatively, the axis of the laser can be aligned so that it is centered on the edge of the knife edge plate. While in the examples pictured a nominal half the beam is impinged on the knife edge plate to establish the reference position, greater or lesser fractions may be used. It is expected that engineering of practical devices will lead to refinement in the essential methodology which is described.

Figure 10:
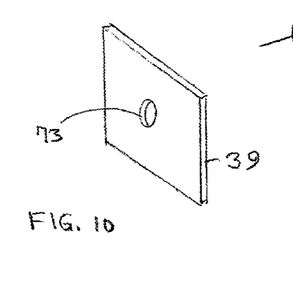
FIG. 10 is a perspective view of an aperture plate.

An aperture plate may replace the knife edge in other embodiments of the invention. FIG. 10 shows an aperture plate 39 having a hole 73. At the baseline or reference condition, e.g., next to no velocity, the gage will be adjusted so the beam is centered on the aperture. When the fluid has velocity, the beam will shift location and only a fraction of the beam will impinge on the intensity sensor. This embodiment will measure fluid velocity in any direction transverse to the beam path. The intensity sensor may be of such character that the direction in which the beam shifts relative to the plane of plate 39 may be also sensed. In the alternative to using a knife edge or aperture plate, a sensor which is small in dimension relative to the beam spot may be used, and deflection of the beam will either produce a signal or not. (There is the obvious complication of the distortion of the beam spot mentioned in connection with FIG. 7. In other embodiments of the invention, intensity sensing may be combined with beam location sensing. For example, the location of the beam on the aperture plate having an associated intensity sensor target may be sensed when the beam hits the plate away from the opening in the plate.

Figure 11:
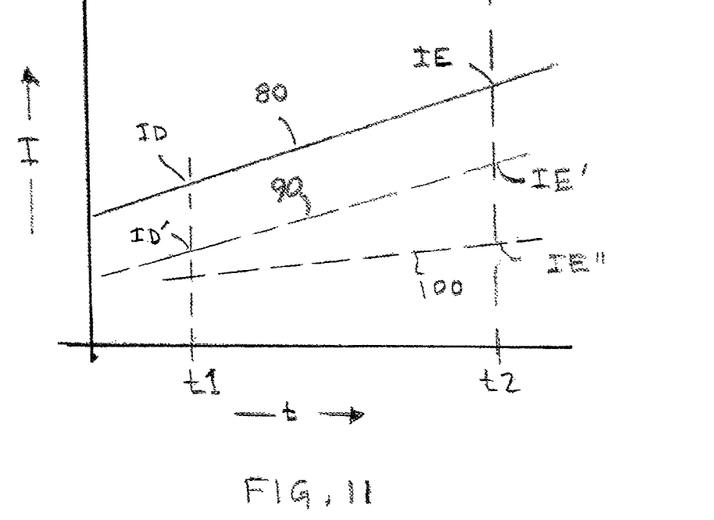
FIG. 11 is a graph showing how laser intensity from a source is diminished by passing through a fluid due to absorption and the effect of fluid velocity.

FIG. 11 shows how the intensity of light received at a sensor, relative to the intensity of light generated by the laser, is a function of two parameters; and indicates that successive measurements may be used to determine what the wind velocity is. The source intensity is indicated by the upper line 80 in the Figure. Irrespective of any velocity of the fluid, there will be absorption or dissipation of beam energy by the fluid when the beam passes through it; and, thus the received beam intensity will be diminished to that illustrated by line 90. Thus, for the measurement taken at time t1, the intensity is decreased from ID to ID'.

Suppose now we increase the source intensity to intensity IE at time t2. Absorption is a function of the intensity of the source and thus we can project the line 90, which gives a calculated value IE' of the beam intensity. If at time t2 the measured beam intensity at a target is that represented by point IE" on the graph, then we know that the difference between IE; and IE" is the wind-effect on the beam. By further measurements, we are able to construct a line 100.

Figures 12, 13:
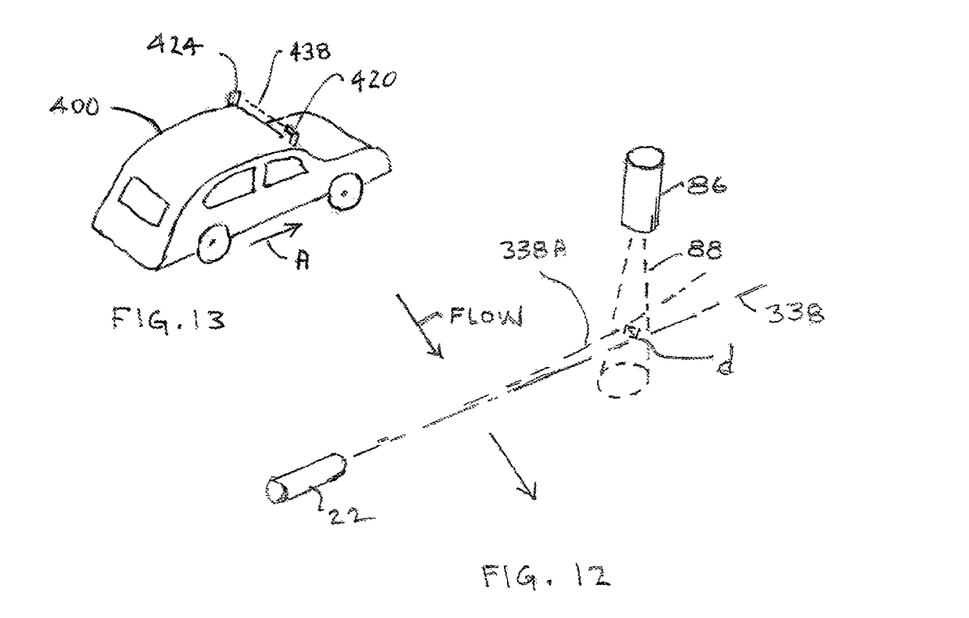
FIG. 12 is a perspective view of a gage where change in beam location is measured by viewing a visible beam.
FIG. 13 is perspective view of a vehicle to which is attached a laser source and a target, for measuring the velocity of the vehicle relative to a surrounding air mass in free space.

In a further embodiment of the invention, the deviation in position of the beam due to the influence of fluid velocity can be determined without use of a target. For example, the fluid medium may be such that the laser beam path through the fluid is visible, as may happen in particulate laden air. With reference to FIG. 12, the spacing d between the beam path 338A and the projection of the straight axial line 338 from the laser source 22 can be sensed, as by an optical or photo sensor 86 or like detector having a cone of view 88 which observes the plane in which the beam moves, i.e. a plane parallel to a flow direction which contains the beam. The foregoing may be considered a direct way of measuring beam deflection.

Thus, to summarize in brief what the foregoing embodiments of the invention exemplify: To measure fluid velocity, an appropriate laser beam is projected through fluid which is in a space along the beam path. The laser beam has a character which effects thermal blooming during passage of the beam through the fluid; and that results in deviation of the beam from the straight line path when the fluid is moving. The deviation is in a direction which is opposite to the direction of the velocity of fluid which is moving. There may be a measuring of the deviation of the beam from the straight line path, either directly, as by observing the beam in space (FIG. 12 here is an example) or by detecting how the beam spot moves on a target as a function of velocity; or there may be a measuring of the effect of the deviation of the beam on a target— for example a decreasing in intensity of the beam on a target as the beam moves as a function of fluid velocity. An example of the latter is measurement of the change in beam intensity when a knife edge, aperture plate or equivalent device is placed in front of the target. An example of the former is direct observation means described in the example of FIG. 12. Another example of the former is to measure the change in beam location where it impacts a target, compared to the location where the beam would have hit the target had it traveled along a straight line path to the target. In embodiments where the beam hits one or more mirrors, in the absence of any flowing fluid, the beam path will comprise two or more straight line segments of path; and one or more such straight line segment of the beam path may that which passes through the space which contains the fluid being measured.

The means for measuring deflection may comprise such as an optical or photometric device which directly observes the beam path, an optical, photometric or electromagnetic device which indicates where the beam impact spot is on a target, and an optical, photometric, electromagnetic or thermal device which measures the intensity of the beam at a target.

Devices like those described above may be attached to an object, such as a motor vehicle, aircraft or watercraft, which is moving through a fluid, and the velocity of the object relative to the fluid is thus measured. For instance, the airspeed of an aircraft can be measured. FIG. 13 is a schematic view of a laser gage mounted on a wheeled motor vehicle 400 traveling in a direction indicated by the arrow A in free space of atmosphere. The gage comprises laser source 420 which sends a beam 438 to target 424, where both the source and the target are mounted on the moving vehicle.

An exemplary laser useful in the invention has a beam, the energy of which is both sufficient to reach the target in passing through the fluid being measured, and the wavelength and intensity of which are sufficient to cause thermal blooming and a resultant beam deviation that can be measured; or which is sufficient to cause a measurable phase change in the light beam. The following examples of laser systems are exemplary and should not be construed as limiting.

An exemplary laser has a beam wavelength which is absorbable by a gas which comprises air, for example by oxygen, and the atmospheric absorption is at least $1.0 \times 10^{-5}$ $cm^{-1}$. For a situation where the range is about 1000 m, an exemplary laser is a collimated 694 nanometer ruby laser which is temperature tuned for atmospheric absorption in the range of about $1 \times 10^{-5}$ $cm^{-1}$ to about $3 \times 10^{-5}$ $cm^{-1}$.

Another exemplary laser is a familiar 10.6 micron $CO_2$ laser. In air, the typical atmospheric absorption is $0.2 \times 10^{-5}$ $cm^{-1}$ when the air has about 440 parts per million $CO_2$ and is at 30% relative humidity and 21° C. (70° F.). Generally, for best performance, a laser will be tuned to a wavelength where the absorption is maximized. For example, a $CO_2$ laser will be tuned so its output wavelength is concentrated in a band centered on about 9 microns, a wavelength at which there is greater atmospheric absorption than at 10.6 microns.

Further exemplary lasers include fiber optic lasers and diode lasers. Within those classes of devices there are multiple choices of wavelength and size. As an example, a laser producing a beam with a wavelength in the range of about 2.2 to 3 microns, preferably 2.9 microns, may be used. The 2.9 micron wavelength is generally considered eye-safe to humans. If a laser of such wavelength is used, the beam location may be ascertained by use of a near infrared detector or a camera to observe the laser spot at the target location.

The laser source is preferably selected from the group comprising (i) a continuous wave laser; (ii) a pulsed laser; and (c) a collimated laser. More information about useful lasers is in grand parent application Ser. No. 12/882,028, now U.S. Pat. No. 8,347,543.

The invention fulfills the objectives in providing a means for measuring the velocity of a gas without contacting the fluid. Since the deflection of the beam is greater for low fluid velocities, the invention is particularly useful for measuring low velocities.

The invention, with explicit and implicit variations and advantages, has been described and illustrated with respect to one or more embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail without departing from the spirit and scope of the claimed invention.

What is claimed is:

1. A method for measuring the velocity of a moving fluid which comprises:
   producing a laser beam using a laser beam source, wherein the laser beam effects thermal blooming during passage of the beam through the fluid and causes deflection of the beam from a straight line path when the fluid is moving with a velocity component transverse to the beam path;
   projecting the beam along a path which passes through a space within which is the fluid being measured; and,
   measuring directly or indirectly the deflection of the beam within said space and thereby determining the velocity of the fluid.

2. The method of claim 1 further comprising: providing a target along the beam path at a point which is at or beyond a bound of said space, so the beam impacts at least in part on the target; and, observing the deflection of the beam by sensing on the target a change in location of beam impact point or a change in intensity of the beam.

3. The method of claim 1, further comprising: interposing one or more mirrors along the beam path.

4. The method of claim 2, wherein the target is located beyond the bound of said space, further comprising: positioning a knife edge or aperture plate along the laser beam path between the target and the laser beam source to intercept a portion of the beam after the beam has passed through said space; and measuring the intensity of the beam on the target.

5. The method of claim 1 wherein said space is within a conduit comprising a wall, the conduit having opposing sides and a length along which said fluid may flow.

6. The method of claim 2 wherein said space is within a conduit comprising a wall, the conduit having opposing sides and a length along which said fluid may flow, which further comprises: positioning the laser beam source at one side of the conduit and positioning the target at the opposing side of the conduit.

7. The method of claim 2 wherein said space is within a conduit comprising a wall, the conduit having opposing sides and a length along which said fluid may flow, which further comprises: positioning the laser beam source at one side of the conduit; providing at least one mirror on the opposing side of the conduit; and, positioning the target at a location other than the location of the mirror.

8. The method of claim 7 wherein the target is positioned on the same side of the conduit as the laser source.

9. The method of claim 2 wherein the velocity being measured is the fluid velocity relative to an object moving through the fluid, and wherein the laser beam source and the target are mounted on the object.

10. A method for measuring the velocity of a moving fluid which comprises:
producing a laser beam using a laser beam source; wherein the laser beam effects thermal blooming during passage of the beam through the fluid and causes deflection of the beam from a straight line path when the fluid is moving with a velocity component transverse to the beam path;
projecting the beam along a straight line, at least a portion of which passes through the moving fluid, so the beam impacts on a target; and,
sensing at the target at least one of (a) the distance between the point of laser beam impact and the point on the target where the beam would impact if it travelled along said straight line, and (b) the change in intensity of beam radiation received at the target due to deflection of the beam from said straight line path; and,
calculating the velocity of the fluid transverse to the beam path based on said sensing.

11. Apparatus for measuring the velocity of a fluid which comprises:
means for producing a laser beam which effects thermal blooming during passage through the fluid and thereby causes deflection of the beam from a straight line path when the fluid is moving with a velocity component transverse to the beam path,
means for projecting the laser beam along a path at least a portion of which passes through a space that contains said fluid;
means for measuring directly or indirectly the deflection of the beam within said space and thereby determining the velocity of the fluid.

12. The apparatus of claim 11, wherein said means for producing is a laser beam source selected from the group which comprises (a) a continuous wave laser; (b) a pulsed laser; and (c) a collimated laser;
wherein the means for projecting the laser beam comprises mounting a laser beam source in vicinity of said space; and,
wherein the means for measuring deflection comprises at least one device selected from the group comprising an optical or photometric device which directly observes the beam path; an optical, photometric or electromagnetic device which indicates where the beam impact spot is on a target; and an optical, photometric, electromagnetic or thermal device which indicates the intensity of the beam where it impacts the target.

13. The apparatus of claim 11 further comprising:
target means positioned along said beam path; wherein the means for measuring comprises means for sensing the location or intensity of the beam at said target.

14. The apparatus of claim 12 further comprising one or more mirrors or lenses mounted along the beam path between the beam source and target.

15. The apparatus of claim 13 further comprising an object capable of moving through the fluid, wherein the means for producing, the means for projecting, and the target means are mounted on the object.

16. Apparatus for measuring the velocity of a fluid flowing in a conduit comprising a wall with one or more ports for laser beam transmission therethrough, the conduit having opposing sides and a length along which said fluid may flow, which further comprises:
a laser beam source for producing a laser beam which effects thermal blooming during passage through the fluid and thereby causes deflection of the beam from a straight line path when the fluid is moving with a velocity component transverse to the beam path, the source mounted with respect to a first side of the conduit so the beam projects within the conduit transversely to the length of the conduit;
a target mounted with respect to the conduit wall so that the laser beam impacts partially or wholly on the target at an impact point after passing through the fluid; and,
sensing means for ascertaining on the target a change in location of the beam impact point or a change in intensity of the beam at the impact point, and thereby determining the deflection of a beam caused by movement of fluid along the conduit length.

17. The apparatus of claim 16 wherein the target is located on the second opposing side of the conduit.

18. The apparatus of claim 16 further comprising one or more mirrors or lenses positioned between the laser beam source and the target.

19. The apparatus of claim 16 further comprising a mirror located at the second opposing side of the conduit; wherein the target is located in vicinity to the laser beam source.

20. The apparatus of claim 16 which further comprises: plate positioned along the beam path in front of the target, so that a portion of the projected beam produced by the laser beam source impinges on the plate and a portion of the beam impinges on the target.

* * * * *